United States Patent

Topol

[15] 3,693,797
[45] Sept. 26, 1972

[54] APPARATUS FOR ADDING MATERIAL TO LIQUIDS

[72] Inventor: George J. Topol, 65 Charleston Ave., Hamilton, Ontario, Canada

[22] Filed: May 8, 1970

[21] Appl. No.: 33,179

Related U.S. Application Data

[63] Continuation of Ser. No. 636,530, May 5, 1967, abandoned.

[52] U.S. Cl. ..................................... 210/96, 210/193
[51] Int. Cl. ............................................ B01d 37/02
[58] Field of Search .......... 210/96, 141, 143, 193, 85; 137/93, 467.5

[56] References Cited

UNITED STATES PATENTS

| | | | |
|---|---|---|---|
| 2,952,363 | 9/1960 | Griswold | 210/193 |
| 3,064,816 | 11/1962 | Griswold | 210/193 X |

*Primary Examiner*—John Adee
*Attorney*—Jeffers and Young

[57] ABSTRACT

The turbidity of a liquid is measured before and after material has been added. The relative values of the measured turbidities are used to control the addition of the material so that the amount of material is added in any desired quantity or ratio relative to the liquid.

2 Claims, 11 Drawing Figures

INVENTOR.
GEORGE J. TOPOL
BY
Jeffers and Young
ATTORNEYS

EXCESS OF SLURRY

NORMAL SLURRY & DEFICIENCY OF SLURRY

SLURRY PROPORTIONER WITH CHANGING TURBIDITY

INVENTOR.
GEORGE J. TOPOL
BY
Jeffers and Young
ATTORNEYS

SLURRY PROPORTIONER WITH CHANGING FLOW

SLURRY PROPORTIONER WITH CHANGING SLURRY CONCENTRATION

APPARATUS FOR ADDING MATERIAL TO LIQUIDS

This application is a continuation of application Ser. No. 636,530 filed May 5, 1967 and now abandoned

BACKGROUND OF THE INVENTION

My invention relates to apparatus for adding a material to a liquid, and particularly to such apparatus for automatically adding material to a liquid in any desired quantity or ratio with respect to the quantity of liquid. More particularly, my invention relates to apparatus for automatically adding filter material in any desired quantity or ratio relative to the quantity of a liquid which is to be filtered.

In many filtering applications, the liquid to be filtered is supplied with a filter material such as diatomaceous earth or fuller's earth before the liquid passes into the actual filter structure. This added filter material assists in removing undesired foreign matter or contaminants from the liquid as it passes through the filter structure. The filter material is usually added to the liquid as a slurry (sometimes referred to as body feed) so as to provide better distribution of the filter material throughout the liquid. The slurry is usually prepared in a tank which is arranged so that the slurry may flow into the liquid to be filtered, or so that the liquid to be filtered passes through the tank and picks up the slurry. The filter material is one of the most expensive items in a filtering operation. Hence, it is important that the amount of slurry relative to the amount of liquid be controlled as closely as possible to prevent an excess or unnecessary amount of filter material to be added. Likewise, it is important that the amount of filter material be sufficient to provide the desired degree of filtering. An insufficient amount of filter material provides an insufficient filtering, with the result that the liquid must then be re-filtered, or thrown away.

Accordingly, an object of my invention is to provide an improved apparatus for adding filter material to liquid that is to be filtered.

Another object of my invention is to provide apparatus for adding material to a liquid in a predetermined or desired quantity or ratio relative to the quantity of liquid.

In prior filter applications, the slurry has generally been added in fixed quantities. If necessary or desirable, these quantities were changed by a manual adjustment. If the liquid to be filtered flows at varying rates, or if the liquid to be filtered has varying amounts of foreign matter or contaminants, or if the slurry concentration changes, it is difficult, if not impossible, to manually adjust the amount of filter material added to provide the desired degree of filtering.

Accordingly, another object of my invention is to provide an improved apparatus for adding a desired quantity of filter material relative to a quantity of liquid and foreign matter or contaminants, despite variations in the amount of liquid, or variations in the amount of foreign matter or contaminants in the liquid, or variations in the concentration of filter material.

Another object of my invention is to provide an improved apparatus for adding material to a liquid, the apparatus having means that change the amount of filter material added in accordance with the amount of liquid to be filtered or in accordance with the amount of foreign matter or contaminants in the liquid to be filtered.

Another object of my invention is to provide an improved apparatus for automatically controlling the amount of filter material added to a liquid from a slurry tank so that the ratio of filter material to liquid and contaminants may be maintained as desired.

Another object of my invention is to provide improved apparatus for automatically controlling the amount of filter material added from a slurry tank to a liquid in accordance with the amount of liquid to be filtered and/or in accordance with the amount of foreign matter or contaminants in the liquid to be filtered.

Summary of the Invention

Briefly, these and other objects are achieved in accordance with my invention by measuring the turbidity of the liquid at two locations. The first measurement is taken before the material has been added to the liquid, and the second measurement is taken after the material has been added to the liquid. First and second signals indicative of the two measurements are compared to produce a control signal indicative of the relative values of the two measurement signals. Since the second signal indicates a higher turbidity because of the added material, the second signal may be reduced to any desired ratio or proportion of its original value. The control signal is used to automatically supply material to the liquid. In a preferred embodiment, when the control signal is positive, excess turbidity and material are indicated, so that the positive control signal is used to decrease the amount of material added, or is used to stop the addition of material. When the control signal is negative deficient turbidity and material are indicated, so that the negative control signal is used to increase the amount of material added, or is used to begin the addition of material. Thus, the control signal regulates the amount of material added in a closed-loop type of servo system.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

DESCRIPTION OF THE PREFERRED EMBODIMENTS

Figure 1:
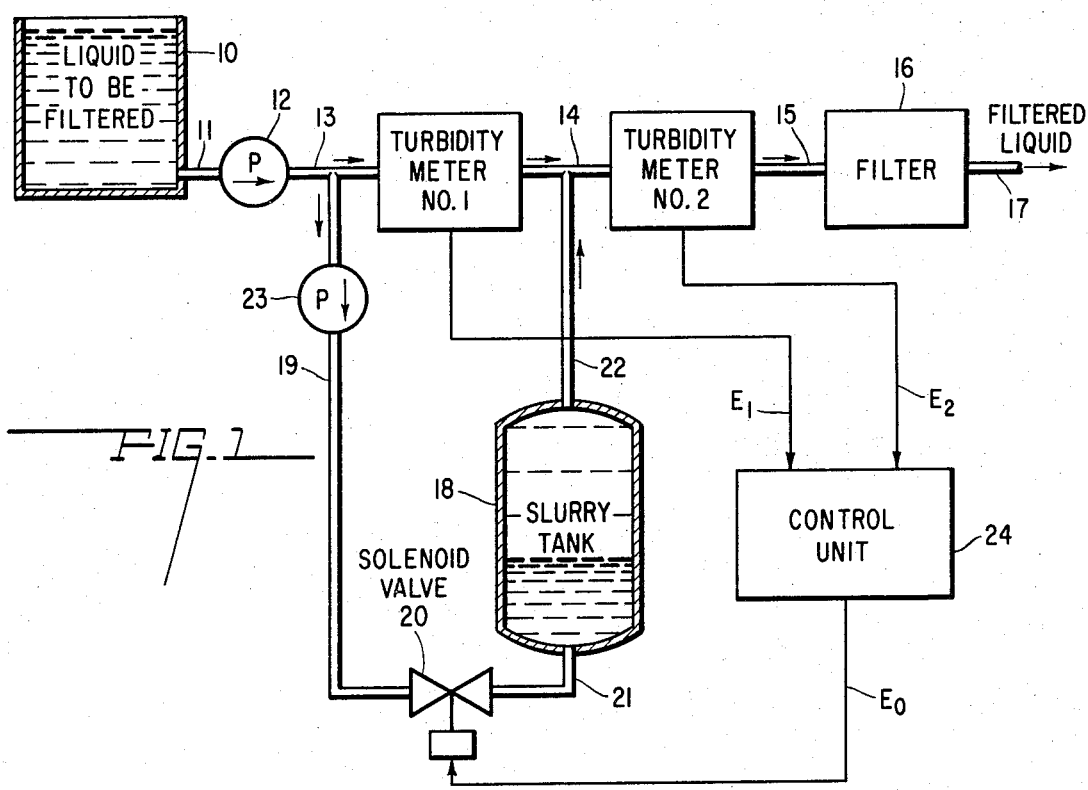
FIG. 1 shows a preferred embodiment of apparatus in accordance with my invention for adding filter material to a liquid to be filtered.

FIG. 1 shows a preferred embodiment of the apparatus for adding material to a liquid in accordance with my invention. In FIG. 1, and in other subsequent figures, I have illustrated my invention as being used to add filter material to a liquid which is to be filtered. However, it is to be understood that my invention may be used in other applications where a material having some measurable turbidity is to be added to a liquid which also has some measurable turbidity. Likewise, my invention may be used to add material to a liquid where either the material or the liquid has some measurable indication of concentration or color.

In FIG. 1, the liquid to be filtered is shown as being contained in a tank 10. This liquid is drawn from the tank 10 through a pipe 11 and pumped by a pump 12 through a line 13 to a turbidity meter No. 1. The turbidity meter No. 1 may be any known type of meter which senses the turbidity or color of a liquid, and produces an electrical output signal $E_1$ in response to the turbidity or color sensed. Such meters are known in the art, and a typical turbidity meter utilizes a photosensitive device and a light source arranged so that the liquid to be measured passes between the photosensitive device and light source. The liquid passes from the turbidity meter No. 1 through a line 14 to a turbidity meter No. 2, which may be similar to meter No. 1. The turbidity meter No. 2 measures the turbidity of the liquid at this point, and produces an electrical output signal $E_2$ in response to the turbidity or color sensed. The liquid then passes from the turbidity meter No. 2 through a line 15 to a filter 16 where it is filtered. The filter 16 may be any known type of filter which provides the desired type and degree of filtering for the liquid. The liquid leaves the filter 16 through a line 17 where it is utilized. The filtering of the liquid in the filter 16 is aided by the use of a filter material such as, but not limited to, diatomaceous earth or fuller's earth. Since these filter materials are known, they will not be discussed in this application. The filter material is placed in a slurry tank 18 where it is mixed with a suitable carrying liquid. In this embodiment, liquid from the tank 10 is pumped by a pump 23 through a line 19, through a solenoid valve 20, and through a line 21 to the slurry tank 18. There the liquid is mixed with the filter material, and is supplied by a line 22 to the line 14 between the turbidity meter No. 1 and the turbidity meter No. 2. The additional pressure from the pump 23 forces the slurry through the line 22 and into the line 14 in accordance with the condition of the solenoid valve 20. If the solenoid valve 20 is open, then slurry from the tank 18 flows into the line 14. If the solenoid valve 20 is closed, then no slurry flows into the line 14. The output signals $E_1$ and $E_2$ from the turbidity meter No. 1 and the turbidity meter No. 2 are supplied to a control unit 24. This control unit 24 compares the relative magnitudes or values of the signals $E_1$ and $E_2$, and produces an output signal $E_0$ which is indicative of the relative values of these two measurement signals $E_1$ and $E_2$. The output signal $E_0$ is applied to the solenoid valve 20 to open and close the solenoid valve 20 in accordance with this output signal $E_0$. As will be explained, the output signal $E_0$ is, in the embodiment of FIG. 1, and on-off type of signal so that the solenoid valve 20 is either open or closed. However, it is to be understood that the output signal $E_0$ may be a gradually changing signal which gradually changes the opening of a controlled valve so that less or more liquid flows into the slurry tank 18, and less or more slurry flows into the line 14. As will be explained, whether slurry is pumped into the line 14 depends upon the relative values of the measurements provided by the turbidity meter No. 1 and the turbidity meter No. 2.

Figure 2:
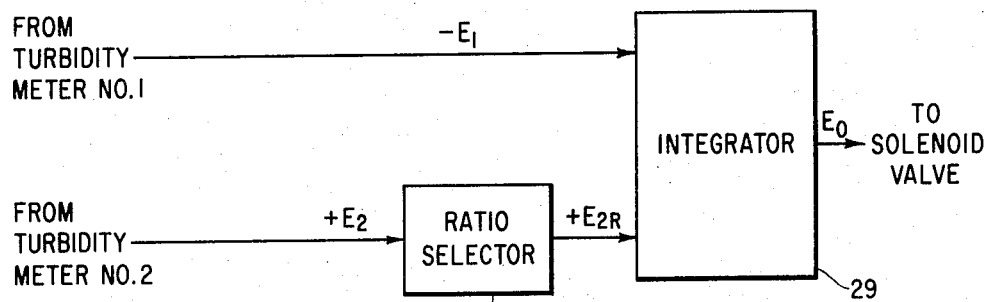
FIG. 2 shows a schematic block diagram of the circuit elements which are utilized in the control unit shown in FIG. 1.

FIG. 2 shows a schematic block diagram of the control unit 24 of FIG. 1. The two signals $E_1$ and $E_2$ are, in this embodiment, direct current signals. If amplification of these signals $E_1$ and $E_2$ is needed, the signals are applied to respective amplifiers which, if the signals are direct current, should be linear. While the explanation of the invention is based on direct current signals, it is to be understood that alternating current signals can be used and compared in phase or magnitude to produce a suitable output signal. The signal $E_1$ from the turbidity meter No. 1 is given a negative polarity that becomes increasingly negative as the turbidity measured by the turbidity meter No. 1 increases. The signal from the turbidity No. 2 is given a positive polarity that becomes increasingly positive as the turbidity measured by the turbidity meter No. 2 increases. It will be seen that the turbidity meter No. 1 measures the turbidity of the liquid to be filtered without the slurry, but that the turbidity meter No. 2 measures the turbidity of the liquid to be filtered with the turbidity of the slurry added into the line 14. Hence, the signal $E_2$ is applied to a ratio selector 28 which reduces this signal $E_2$ to a signal $E_{2R}$ having the desired ratio or proportion of its original value. This ratio or proportion determines the amount of slurry that will be added. For example, assume for a particular liquid with a particular turbidity that it has been determined that filter material representing 20 per cent of the total turbidity in line 14 must be added. Then, the rate selector would be set so that its output signal $E_{2R}$ is 0.8 the signal $E_2$ produced by the turbidity meter No. 2. The ratio selector 28 may be any type of impedance device (and may be calibrated) which reduces the signal $E_2$ by some desired proportion or to some desired ratio of its original value or magnitude. The signals $E_1$ and $E_{2R}$ are applied to an integrator circuit 29. This integrator circuit 29 may take any known form, and compares the two signals applied to its inputs and produces an output signal having a magnitude and polarity indicative of the relative magnitudes and polarities of the applied input signals $E_1$ and $E_{2R}$. This output signal $E_0$ is applied to the solenoid valve 20 in FIG. 1.

Figure 3:
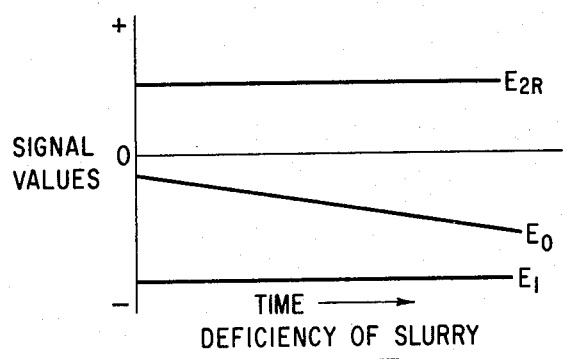
FIGS. 3, 4, and 5 show diagrams illustrating how the measurement signals and the control unit output signal vary with charges in the amount of filter material added.
Figure 4:
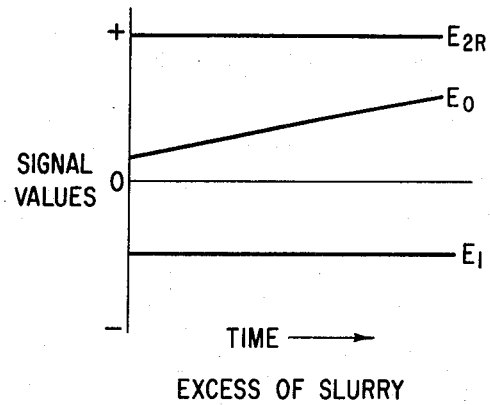
Figure 5:
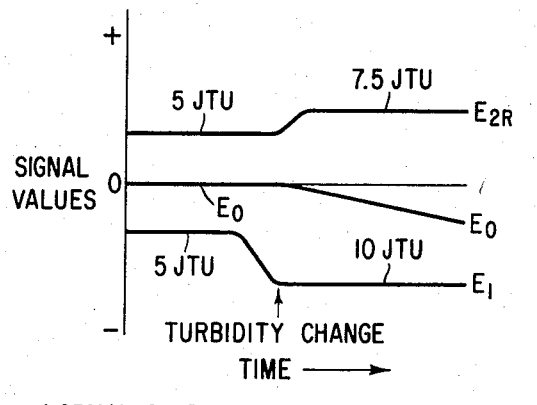

FIGS. 3, 4, and 5 show diagrams of the signal $E_1$ from the turbidity meter No. 1 and the signal $E_{2R}$ from the ratio selector 28 and the turbidity meter No. 2 plotted against time under various conditions. FIGS. 3, 4, and 5 also show the output signal $E_0$ from the integrator 29 under these conditions. In FIG. 3, it has been assumed that the solenoid valve 20 has been closed, and that no slurry is being delivered to the liquid in the line 14. Under this condition, both turbidity meters will indicate the same turbidity. However, since the signal $E_2$ from the turbidity meter No. 2 is reduced by the ratio selector 28 to some lower signal $E_{2R}$, the magnitude of the signal $E_{2R}$ in FIG. 3 is less than the magnitude of the signal $E_1$. The output signal $E_0$ from the integrator 29 has an increasingly negative value which represents the difference between the magnitude of the signals $E_1$ and $E_{2R}$. This negative output signal $E_0$ is applied to the solenoid valve 20 to open the valve 20 and start or increase the amount of slurry feed. In FIG. 4, it has been assumed that an excess of slurry is fed into the line 14. Under this assumed condition, the magnitude of the signal $E_{2R}$ is considerably greater than the magnitude of the signal $E_1$. This condition is shown by the output signal $E_0$ having an increasingly positive polarity. This positive output signal $E_0$ is applied to the solenoid valve 20 to close the solenoid valve 20, or to decrease the amount of slurry feed.

In FIG. 5, two conditions have been assumed. At the beginning, or to the left of FIG. 5, it has been assumed that the amount of slurry needed in the line 22 is such that the turbidity of the slurry in the line 14 is the same as the turbidity of the liquid to be filtered in the line 13. In this same assumption, a typical slurry turbidity might be 5 Jackson Turbidity Units (JTU), and a typical liquid turbidity would then also be 5 JTUs. The turbidity meter No. 1 would produce a signal $E_1$ indicative of 5 JTUs. However, since the liquid in the line 14 has the slurry added to it, the turbidity of the liquid with the slurry reaching turbidity meter No. 2 would be 10 JTUs. Thus, the output signal $E_2$ from the turbidity meter No. 2 would indicate 10 JTUs. Since this is the desired condition, the signal $E_2$ from the turbidity meter No. 2 is reduced to 50 per cent of its magnitude by the ratio selector 28 so that the signal $E_{2R}$ provided by the ratio selector 28 would have a magnitude indicative of 5 JTUs. Thus, as indicated at the left in FIG. 5, the output signal $E_0$ would be zero, and no change in the solenoid valve 20 would take place. At a later time, it is assumed that the turbidity of the liquid in the pipe 13 increases from 5 JTUs to 10 JTUs. This increase is indicated by the change in the signal $E_1$ to a negative value twice its previous value. At a slightly later time, because of the time required for the liquid to flow through the turbidity meter No. 1 and the line 14 to the turbidity meter No. 2, the signal $E_2$ also increases. However, because of the ratio selector 28 being set at 50 per cent, the signal $E_{2R}$ only increases to half of the actual amount of turbidity, namely 15 JTUs. Thus, the signal $E_{2R}$ increases to a positive value indicative of 7.5 JTUs. At this point, the signal $E_1$ is greater in magnitude than the signal $E_2$. Thus, the output signal $E_0$ becomes increasingly negative. This negative signal indicates a deficiency of slurry, and would tend to open the solenoid valve 20. When the valve 20 was properly set, both signals $E_1$ and $E_{2R}$ would be equal again.

Figure 6:
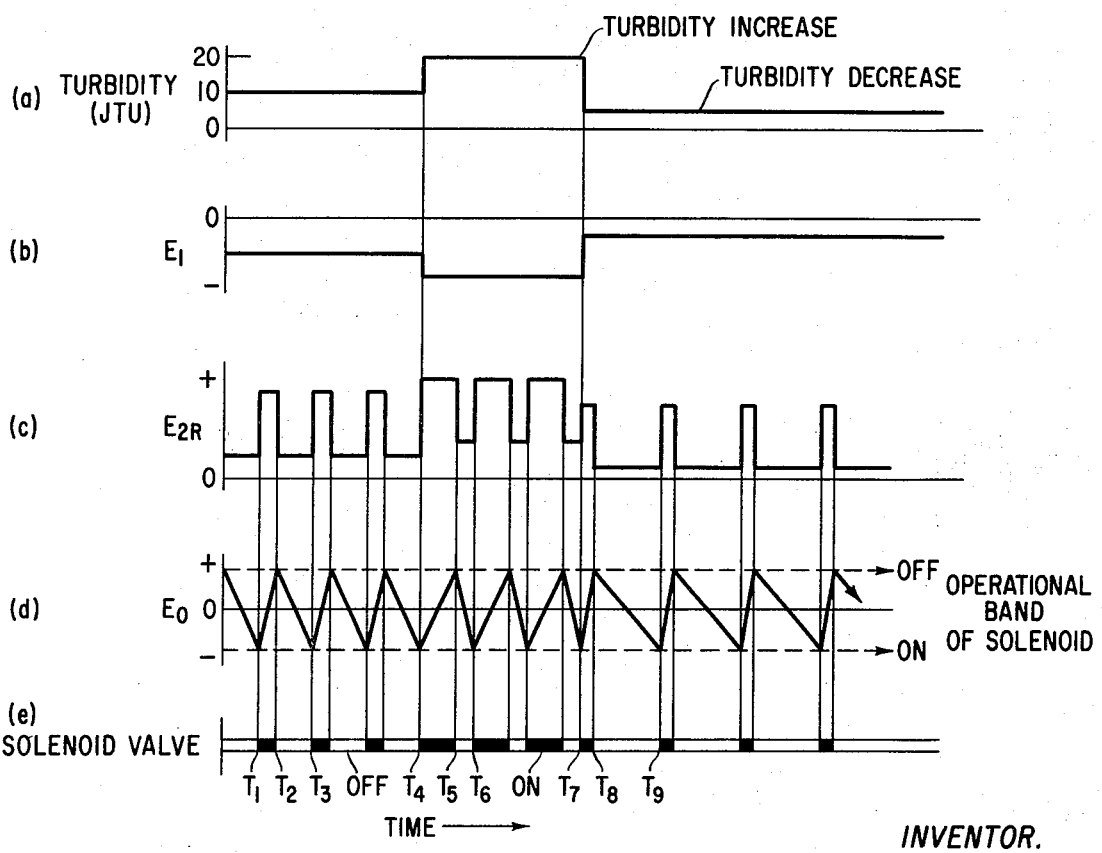
FIGS. 6, 7, and 8 illustrate how the system of FIG. 1 operates with variations in turbidity of the liquid, with variations in the flow of liquid, and with variations in the concentration of filter material.

FIG. 6 shows wave forms indicating how the magnitudes of the signals $E_1$, $E_{2R}$ and $E_0$ change and how the solenoid 20 would operate for changes in turbidity over a period of time. The wave forms of FIG. 6 are plotted against a common time axis. FIG. 6a shows the liquid turbidity in JTUs, and it is assumed that the turbidity of the liquid is initially at 10 JTUs. As shown in FIGS. 6b and 6c, the signal $E_1$ applied to the integrator 29 is at some negative value, and the signal $E_{2R}$ applied to the integrator 29 is at some positive value. At the initial time, and as shown in FIG. 6d, the output signal $E_0$ is positive, but is decreasing toward a negative value because the negative value of the signal $E_1$ is greater than the positive value of the signal $E_{2R}$. At the time $T_1$, the output signal $E_0$ becomes sufficiently negative to cause the solenoid control valve 20 to turn on or open. It has been assumed that the solenoid valve 20 is an on-off type device having the operational band indicated in FIG. 6d. When the solenoid valve 20 opens, it adds slurry to the line 14 with the result that the signal $E_{2R}$ becomes much more positive. This causes the output signal $E_0$ to gradually become more positive. When the output signal $E_0$ reaches the upper operational value shown in FIG. 6d at the time $T_2$, the solenoid valve 20 closes. Thus, the solenoid valve 20 has caused the slurry tank 18 to add slurry between the times $T_1$ and $T_2$. FIG. 6e shows the operation of the solenoid valve, with the dark sections indicating that the valve is on or open, and with the light sections indicating that the valve is off or closed. When the valve closes at the time $T_2$, the signal $E_{2R}$ decreases in magnitude because of the reduced turbidity. The output signal $E_0$ gradually becomes negative until the operational band is reached. The solenoid opens again and adds more slurry.

This operation continues as shown until the time $T_4$ when it is assumed that the turbidity of the liquid increases from 10 JTUs to 20 JTUs as shown in FIG. 6a. The signal $E_1$ becomes more negative as shown in FIG. 6b. The solenoid valve is turned on, and remains turned on until the time T5. The on or open time between the times T4 and T5 is greater than the previous on or open times (between the times $T_1$ and $T_2$ for example). This is because greater turbidity (produced by added slurry) is required before the signal $E_{2R}$ and the output signal $E_0$ becomes sufficiently positive to offset the now greater negative signal $E_1$, so that the output signal $E_0$ can cause the solenoid valve to turn off or close. Once the solenoid valve closes, it takes only a relatively short period from the time $T_5$ to the time $T_6$ until the output signal $E_0$ becomes negative and causes the solenoid valve to turn on or open again. This operation continues until the time $T_7$ when it is assumed that the turbidity decreases to 5 JTUs. This causes the signal $E_1$ to become less negative, with the result that the signal $E_{2R}$ exceeds the signal $E_1$ more easily. The output signal $E_0$ is now negative for a greater length of time. Thus, the solenoid is on or open only for the relatively short period from the time $T_7$ to the time $T_8$, and is off or closed from the relatively long period from the time $T_8$ to the time $T_9$.

Thus, in considering FIG. 6, it will be seen that for a turbidity of 10 JTUs, the solenoid operates to supply slurry about one third of the time. For an increased turbidity, the solenoid operates to supply slurry for about two thirds of the time. For a decreased turbidity, the solenoid operates to supply slurry for about one sixth of the time.

Figure 7:
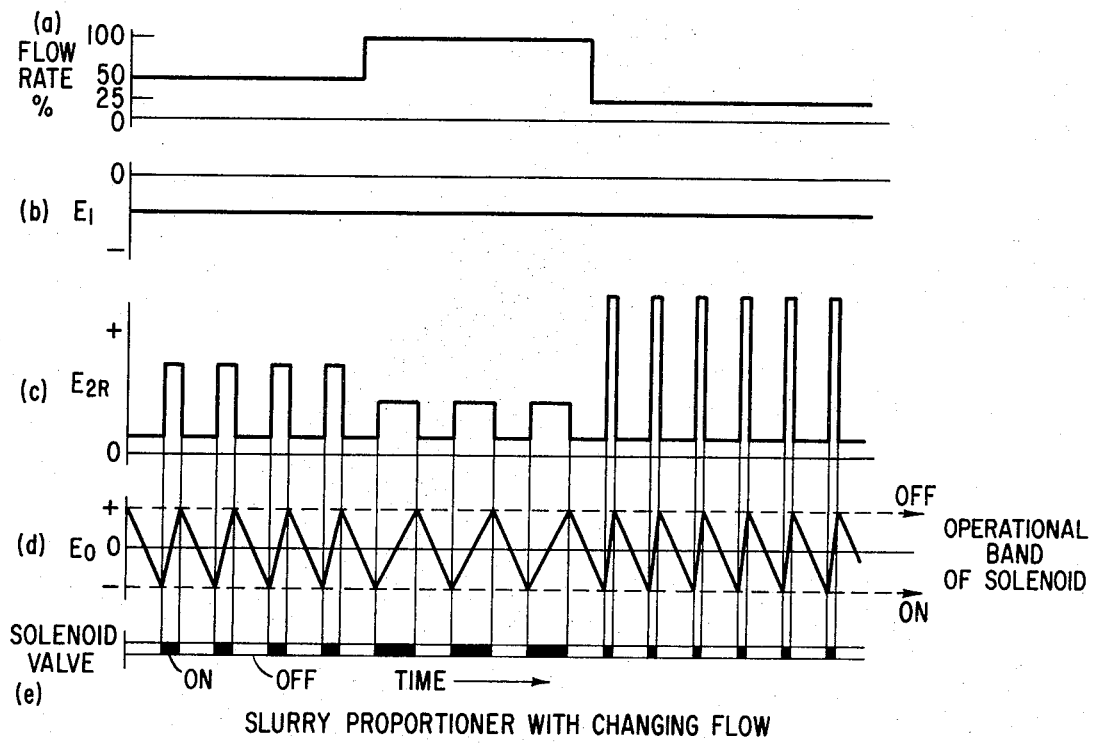

FIG. 7 shows how the system operates where the change or rate of flow of the liquid varies with time, but where its turbidity remains substantially constant. The rate of flow is shown in FIG. 7a and the turbidity indicated by the signal $E_1$ from the turbidity meter No. 1 is shown in FIG. 7b. For a rate of flow of about 50 per cent, the solenoid valve is on or open approximately 30 per cent of the time. When the rate of flow increases to 100 per cent as shown in FIG. 7a, the signal $E_{2R}$ shown in FIG. 6c does not become as positive as before, since more liquid is present with the slurry. When the solenoid valve is turned on or opened, additional slurry is added. But with the increased flow, it takes a longer length of time for this additional slurry to bring the output signal $E_0$ back to a sufficiently positive value to close or turn the solenoid valve off. As shown in FIG. 7d, a longer length of time is required for the output signal $E_0$ to reach the positive value to turn off or close the solenoid valve, so that the solenoid valve is on or open approximately 60 per cent of the time. When the rate of flow is decreased to the 25 per cent value shown, the decreased flow permits the slurry to raise the output signal $E_0$ to a sufficiently positive value relatively quickly so as to close or turn the solenoid off. In this case the solenoid valve is on or open approximately 15 per cent of the time. Thus, the apparatus taken into account the variations in the rate of flow of the liquid to be filtered. As shown in FIG. 7, the apparatus adjusts the slurry feed to compensate for changes in the rate of flow of the liquid to be filtered.

Figure 8:
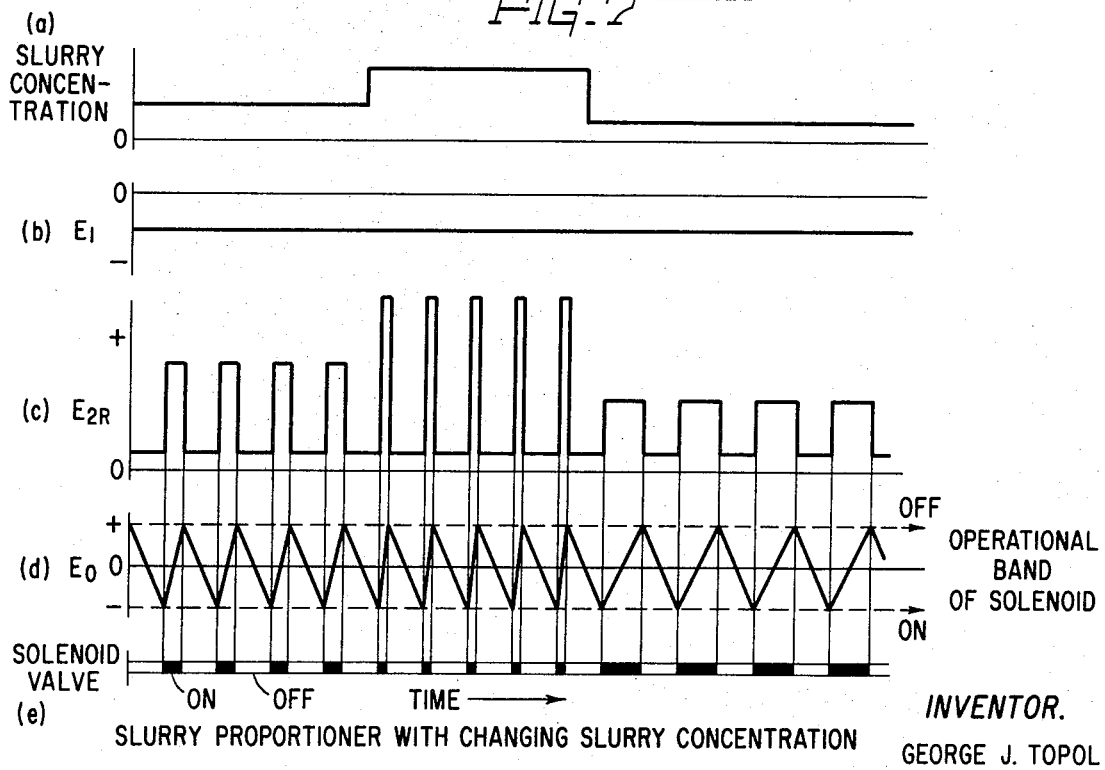

The apparatus can also compensate for changes in the slurry concentration, that is, the desired ratio of filter material to liquid will be maintained despite variations in the concentration of filter material slurry. This is indicated in FIG. 8 which shows the same type of wave forms as FIGS. 6 and 7 for a change in slurry concentration. As the slurry concentration goes up as shown in FIG. 8a, the signal $E_{2R}$ reaches a high positive value so that the output signal $E_0$ reaches a positive value relatively quickly and turns the solenoid off or closes it. Thus, the solenoid valve is closed a relatively large part of the time. Conversely, when the slurry concentration goes down, the signal $E_2$ does not reach a high a positive value, so that the solenoid valve remains open for a relatively large part of the time.

In the preceding figures and discussion, it has been assumed that the integrator 29 is a device having a reasonably long time constant of operation as indicated by the time to cover the operational band of the solenoid, It is to be understood, however, that the integrator may be any type of integrating circuit having a time constant that varies from a relatively short time to a relatively long time. A relatively short time constant results in operation of the solenoid at a high rate and hence close or quick following of changes in rate of flow, turbidity, or slurry concentration. A relatively long time constant results in a reduced rate of solenoid operation, but does not provide sufficiently close or quick following of the changes in turbidity, rate of flow, or slurry concentration. Hence, a time constant suitable for a particular application should be developed by trial and error until the best operation is achieved. If the output signal $E_0$ is a gradually changing analog type of signal, a valve can be provided which is opened a variable amount rather than either open or closed.

Figure 9:
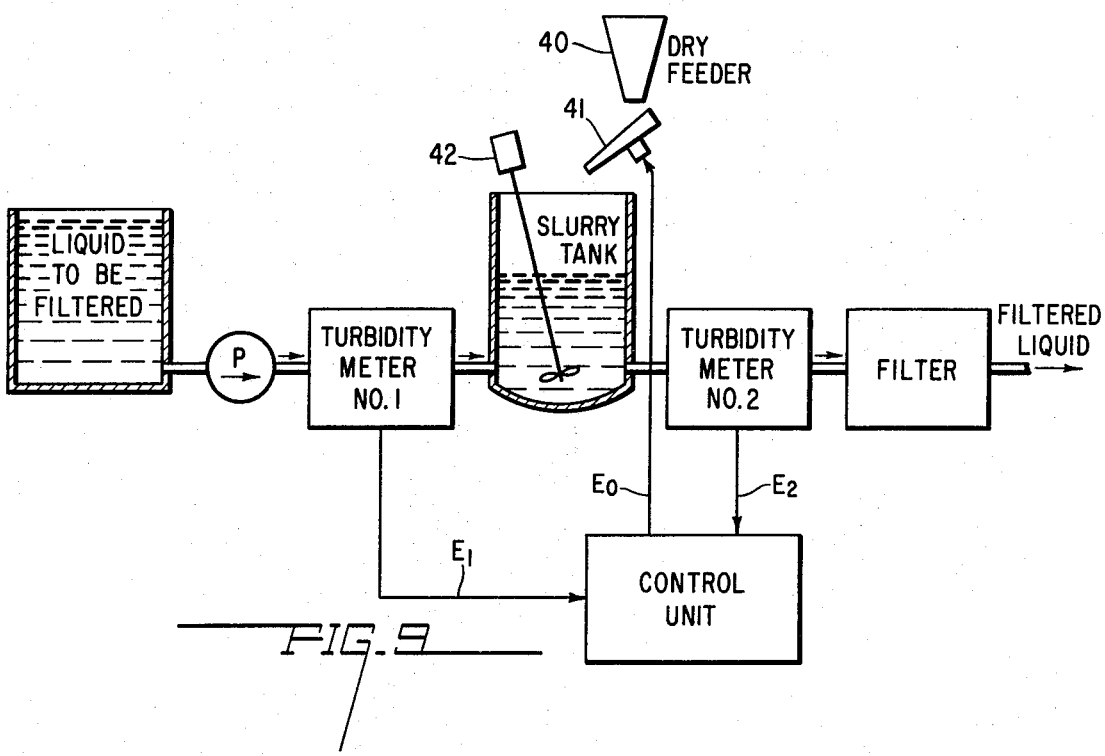
FIGS. 9, 10, and 11 illustrate other systems of filters utilizing my invention.
Figure 10:
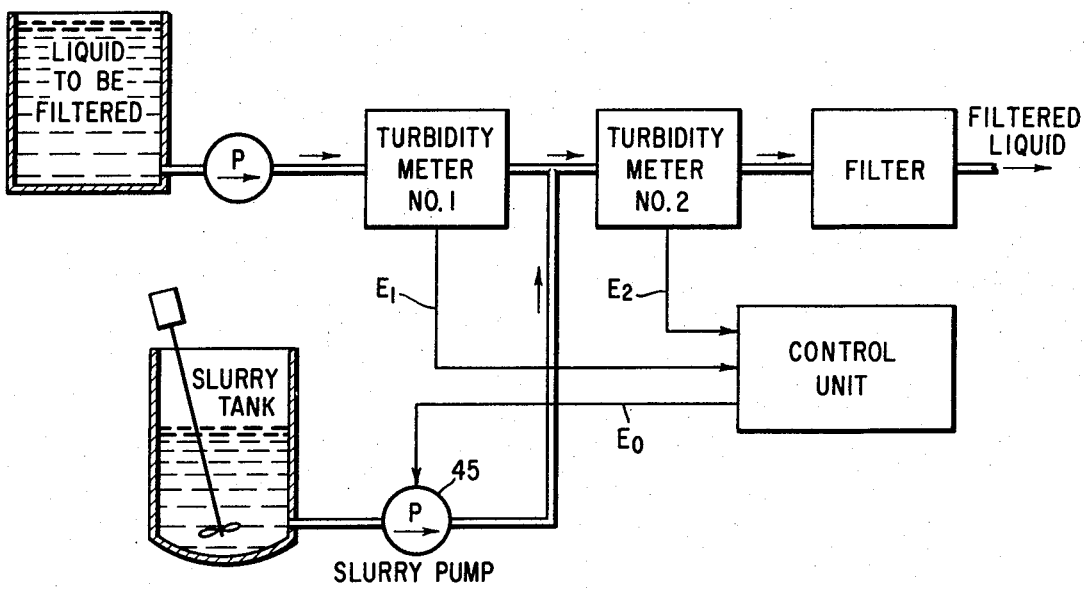
Figure 11:
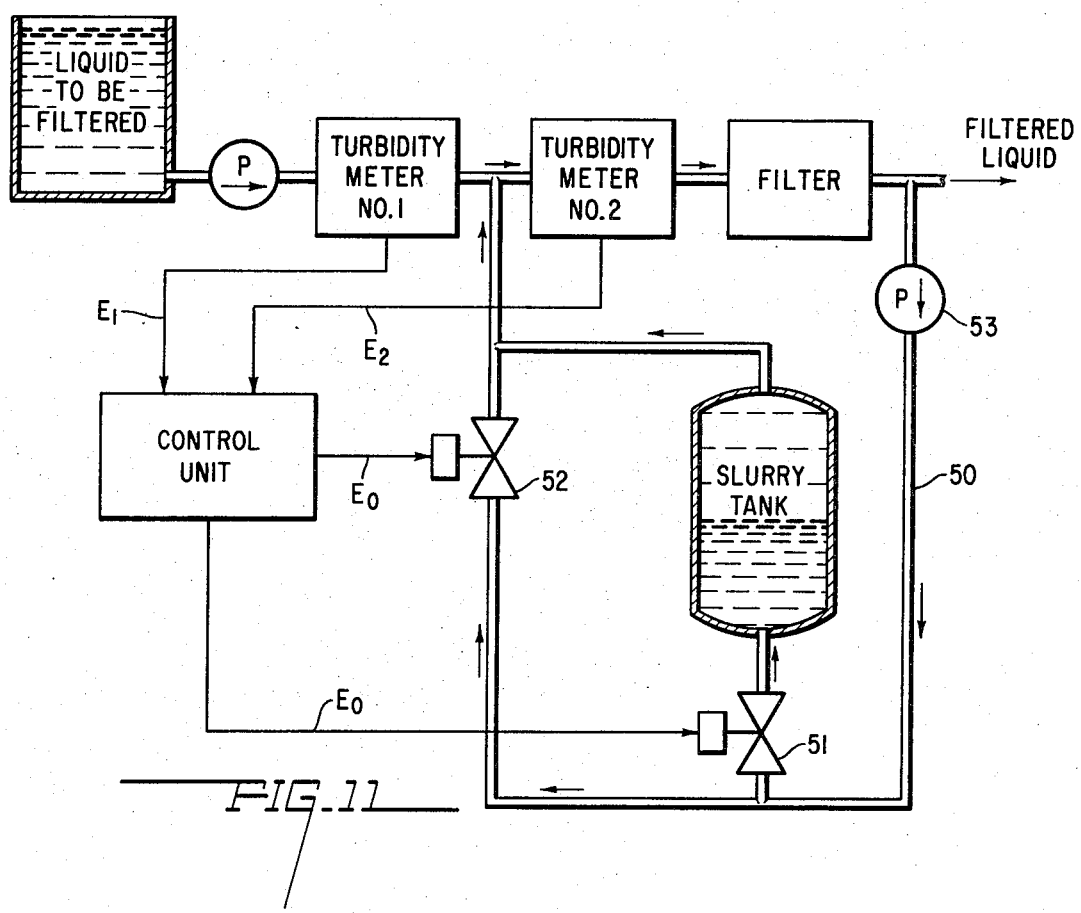

FIG. 1 has shown the operation of my invention with a slurry tank which is supplied with liquid and pressure from the liquid to be filtered. Persons skilled in the art will appreciate that other systems may be provided for the slurry tank. FIG. 9 shows one such system where the slurry tank receives the liquid to be filtered and is supplied with dry slurry from a hopper 40. The slurry passes into a chute 41 where it is permitted to flow into the slurry tank in accordance with the output signal $E_0$ from the control unit. The slurry tank may be provided with a suitable mixer or agitator 42 as shown. FIG. 10 shows another system where the slurry tank is provided with the filter material and it is pumped to the line by a slurry pump 45 which operates in response to the output signal $E_0$. And, FIG. 11 shows a system where the slurry tank is connected in a circulating line 50 by first and second solenoid valves 51, 52. The circulating line 50 is provided with a circulating pump 53 which circulates the liquid to be filtered from the filter output back to a point between the two turbidity meters. Slurry can be introduced into the liquid by opening the solenoid valve 51 and closing the solenoid valve 52. The flow of slurry added can be stopped by closing the solenoid valve 51 and opening the solenoid valve 52. As shown, the control signal $E_0$ is applied to both solenoid valves 51, 52 to provide this dual operation. The arrangement of FIG. 11 is particularly desirable in that the total flow to the filter remains essentially constant and does not fluctuate.

It will thus be seen that my invention provides improved apparatus for controlling the amount of material added to a liquid. My apparatus can be used to add almost any type of material to a liquid as long as either the material or the liquid has a measurable degree of turbidity or concentration. My apparatus provides automatic and accurate addition of the material, thus saving on the amount of material added. The apparatus utilizes a feedback control, and thus provides the desired ratio or amount of material despite changes in the turbidity of the liquid to be filtered, despite variations in the rate of flow of the liquid, and despite variations in the concentration of the material to be added. The apparatus thus reduces the necessary maintenance and attention for the slurry tank, and also permits a relatively small slurry tank to be used. Such a small slurry tank can be activated or operated by any suitable apparatus, such as the pressure of the liquid to be filtered, or by a pump or some other source of pressure. And finally, the apparatus is automatic and does not require attention. Persons skilled in the art will appreciate that modifications may be made to my invention. For example, the apparatus can be used in other applications besides the filtering embodiments shown. For example, such apparatus might be in a chemical plant where an acid is to be diluted, or where a dye must have a certain concentration. Therefore, while my invention has been described with reference to particular embodiments, it is to be understood that modifications may be made without departing from the spirit of my invention or from the scope of the claims.

I claim:

1. Apparatus for adding filter material and the like to a liquid flowing in a system, comprising:
   a. first means positioned at a first location in said system for sensing the turbidity of said liquid at said first location and producing a first electrical signal having a voltage magnitude that varies as a function of the turbidity sensed;
   b. second means positioned at a second location in said system downstream from said first location for sensing the turbidity of said liquid at said second location and producing a second electrical signal having a voltage magnitude that varies as a function of the turbidity sensed;
   c. a source of filter material having an outlet coupled into said system between said first location and said second location, and having a liquid inlet coupled to said system upstream from said filter material outlet, said source including solenoid means for controlling the amount of filter material supplied to said outlet and to said system;

d. utilization means for said liquid coupled to said system downstream from said second location;

e. an electrical comparison circuit having first and second input circuits and an output circuit for comparing said first and second signals applied to said first and second input circuits and producing an electrical output signal at said output circuit that varies in voltage and polarity as a function of the relative characteristics of said first and second signals applied to said first and second input circuits;

f. means respectively coupling said first and second input circuits to said first and second sensing means including ratio means in circuit with said second input circuit and said second sensing means to supply a selectable fraction of said second electrical signal to said second input circuit;

g. and means coupling said output circuit to said control means of said source.

2. The apparatus of claim 1 wherein said solenoid means is operative in response to a control signal of one polarity and inoperative in response to a control signal of an opposite polarity and wherein the electrical comparison circuit comprises an integrator adapted to generate as its said electrical output signal the integral of the difference between the said first electrical signal and the said selectable fraction of the second electrical signal.

* * * * *